Feb. 9, 1971  E. W. LORENCE  3,561,292

DRIVE MECHANISM

Filed Feb. 11, 1969  2 Sheets-Sheet 1

INVENTOR.
Ervin W. Lorence
BY
Andrus, Sceales, Starke & Sawall
Attorneys

Feb. 9, 1971  E. W. LORENCE  3,561,292

DRIVE MECHANISM

Filed Feb. 11, 1969  2 Sheets-Sheet 2

INVENTOR.
Ervin W. Lorence

BY

Attorneys

United States Patent Office 3,561,292
Patented Feb. 9, 1971

3,561,292
DRIVE MECHANISM
Ervin W. Lorence, Cedarburg, Wis., assignor to Lorence
Manufacturing Corp., Milwaukee, Wis., a corporation
of Wisconsin
Filed Feb. 11, 1969, Ser. No. 798,375
Int. Cl. F16h 1/28
U.S. Cl. 74—804        9 Claims

ABSTRACT OF THE DISCLOSURE

A transmission which selectively provides multiple output speeds as well as free wheeling and a positive braking action for the output member. The transmission includes an input shaft driven by a hydraulic motor and the shaft drives an eccentric within an opening in a floating gear unit. The gear unit includes a small gear and a large gear, each of which meshes with a gear ring and both gears have a lesser number of teeth than the corresponding gear rings. The gear unit is connected to the output shaft by a member which converts the eccentric rotation of the gear unit to concentric rotation for the output shaft.

Each gear ring can be selectively changed between a fixed and a rotatable condition. When either of the gear rings is in a fixed condition, a speed reduction is provided for the output shaft. When both gear rings are in a rotatable condition a free wheeling condition is achieved in which the output shaft can rotate freely and if both gear rings are in a fixed or nonrotatable position a positive braking action is achieved.

---

The invention relates to a drive mechanism or transmission and more particularly to a transmission to be used in conjunction with a hydraulic motor.

The conventional hydraulic drive system is not capable of free wheeling unless the hydraulic line is opened or the drive train from the hydraulic motor is mechanically disengaged. It is often desirable when utilizing a hydraulic drive for smaller vehicles, such as lift trucks, tractors, snow vehicles and the like, to not only provide a multiple speed drive but also to provide free wheeling so that the vehicle can be towed or pushed, if desired.

The present invention is directed to a transmission for a hydraulic motor which selectively provides a multiple speed drive as well as providing free wheeling and a positive braking action for the output member. According to the invention, the drive shaft from the hydraulic motor acts to drive an eccentric within an opening in a floating gear unit. The gear unit includes a small gear and a large gear, each of which is engaged with a gear ring. Both the small gear and the larger gear have a less number of teeth than the corresponding gear ring.

The floating gear unit is connected to the output shaft through a mechanism which converts the eccentric rotation of the gear unit to concentric rotation in the output shaft.

Each gear ring can be moved between a fixed or locked position and a freely rotatable position. When both gear rings are in a freely rotatable position, the drive mechanism is in a free wheeling state in which the output shaft can freely rotate and the vehicle can be towed or pushed.

When the gear ring associated with the large gear is in the fixed position and the gear ring associated with the small gear is in the freely rotatable position a high speed reduction or low speed drive is achieved, and conversely, when the small gear ring is in the fixed position and the large gear ring is in the freely rotatable position, a low speed reduction or high speed drive is produced. When both of the gear rings are in the fixed position, a positive braking action is achieved which prevents free rotation of the output shaft.

The drive mechanism of the invention is particularly adaptable for use with small vehicles such as tractors, lift trucks, snow vehicles and the like and provides a multiple speed drive as well as either a free wheeling action or a positive braking action when the motor is not operating.

By incorporating a positive braking mechanism, no auxiliary brake is required to prevent free rotation of the output member when the motor is stopped.

The drive mechanism provides a substantial speed reduction from the hydraulic motor to the output shaft with a minimum number of parts. By decreasing the number of parts over that of a conventional speed reducing transmission, the overall cost of the drive mechanism is reduced.

Other objects and advantages will appear in the course of the following description.

The drawings illuustrate the best mode presently contemplated of carrying out the invention.

Figure 5:
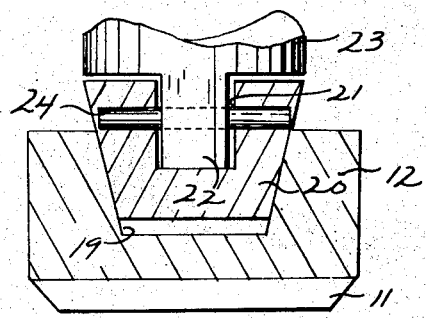
FIG. 5 is an enlarged fragmentary section showing the connection of one of the shoes to the operating rod.

The drawings illustrate a drive mechanism to be employed with a vehicle such as a garden tractor, lift truck, snow vehicle or the like. The input shaft 1 is adapted to be connected to a source of power, such as a hydraulic motor, and shaft 1 is secured by a key 2 within an opening in an eccentric 3. The hub of eccentric 3 is journalled within a bearing 4 mounted in the casing 5, while the outer eccentric surface of eccentric 3 is mounted for rotation within the central opening in a floating gear unit 6 by a bearing 7.

The gear unit 6 includes a small gear 8 and a large gear 9 which are integrally connected and rotate as a unit. The small gear 8 is provided with a series of teeth 10 which mesh with the teeth 11 on a gearing ring 12 mounted for rotation in a bearing 13 carried by casing 5.

Figure 1:
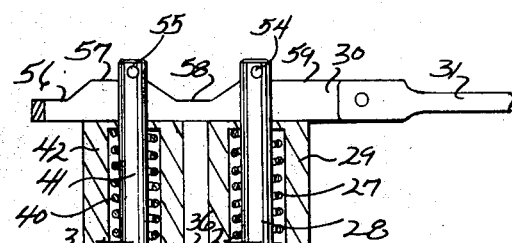
FIG. 1 is a longitudinal section of the drive mechanism of the invention.
Figure 1:
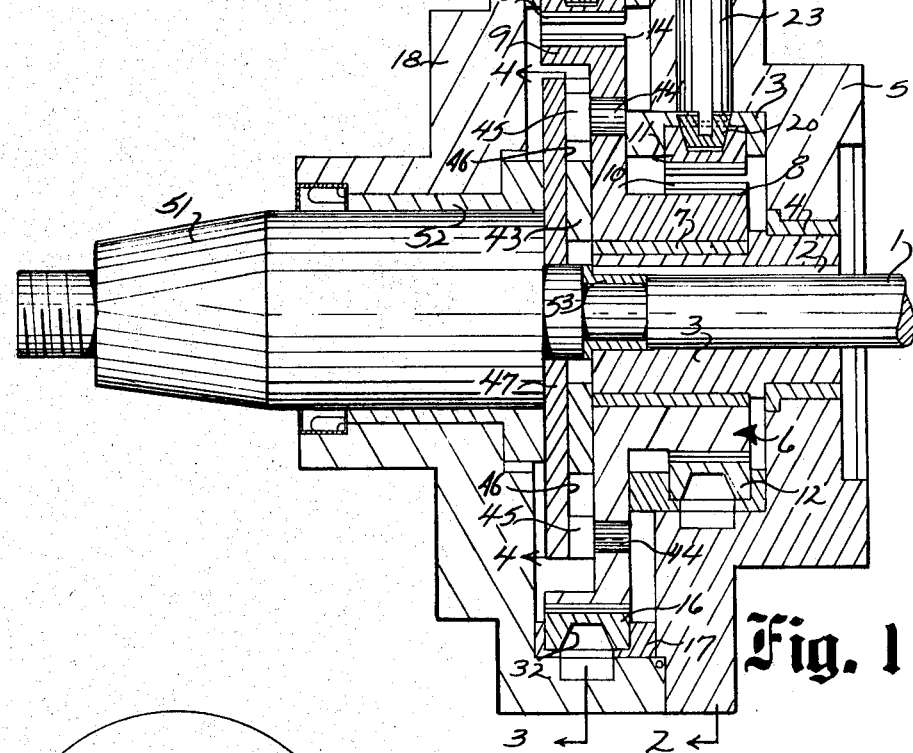
Figure 4:
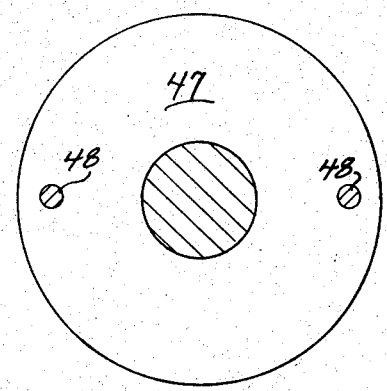
FIG. 4 is a section taken along line 4—4 of FIG. 1.
Figure 2:
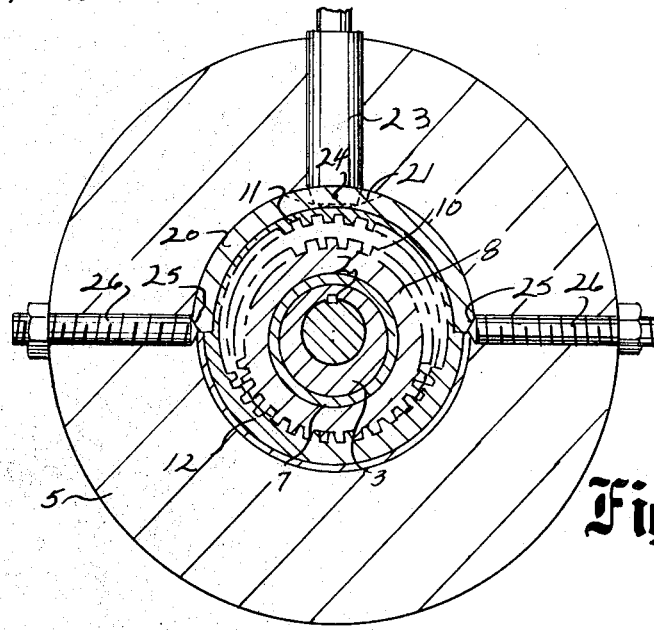
FIG. 2 is a transverse section taken along line 2—2 of FIG. 1.

While the shape of the teeth 10 and 11 is not critical, the teeth 10 and 11 are of identical shape and size. The gear ring 12 has a greater number of teeth than the gear 8 and generally there will be from two to four more teeth 11 than teeth 10. This results in the external diameter of the gear 8 being smaller than the internal diameter of the gear ring 12, as shown in FIG. 1. Due to the difference in the number of teeth, only about ten or twelve of the teeth 10 will be in engagement with the teeth 11 of the gear ring 12 at any time during rotation of the gear 8.

The pitch of the eccentric 3 has a relation to the pitch diameter of the teeth 10 and 11 and the pitch diameter of the teeth 10 and 11 determines the throw.

The large gear 9 of the gear unit 6 is provided with a series of teeth 14 which mesh with the teeth 15 on a gear ring 16. Gear ring 16 is journalled for rotation within a bearing 17 mounted in the outer casing 18 which is connected to the casing 5.

The teeth 14 and 15 are identical in size and shape to each other and are also identical in size and shape to the teeth 10 and 11. There are a lesser number of teeth 14 than teeth 15 and the difference between the number of teeth is the same as the difference in number between the teeth 10 and 11.

According to the invention, the gear rings 12 and 16 can either be freely rotatable with respect to the casing or individually, they can be locked or fixed with respect to the casing. To lock the gear ring 12 to the casing 5, the outer surface of the gear ring is provided with a circumferential groove 19 having tapered sidewalls, and a shoe 20 is located within the groove. As best shown in FIG. 5, the shoe has tapered side walls to compliment the side walls of groove 19. The shoe 20 extends through an arc of approximately 180°. Formed generally midway in the length of the shoe 20 is a slot 21 and a lug 22 attached to the inner end of rod 23 is disposed within the slot 21 and is pivotally connected to the shoe 20 by pin 24.

The rod 23 is mounted for sliding movement within an opening in the casing 5 and as the rod 23 moves inwardly, toward the axis of the shaft 1, the tapered ends 25 of the shoe 20 engage the inner ends of set screws 26 which act to wedge or force the ends 25 of the shoes inwardly into tight clamping relationship with the gear ring 12. Thus, inward movement of the rod 23 acts to move the shoe 20 into clamping engagement with the gear ring 12 to thereby lock or fix the gear ring with respect to the casing 5 and prevent relative rotation between the members.

As best shown in FIG. 1, the rod 23 is biased inwardly by a coil spring 27 which surrounds the upper reduced diameter portion 28 of the rod 23 and bears against the end of a cap 29 threaded within an opening in the casing 5. The rod 23 is moved inwardly and outwardly to thereby move the clamping shoe 20 between a clamping and a released position by an operating lever 30 provided with a handle 31. The operation of lever 30 in moving the shoe 20 between the clamping and the released positions will be described in greater detail later in the description.

The gear ring 16 is adapted to be either fixed or freely rotatable with respect to casing 18 in a manner similar to that described with respect to gear ring 12. The gear ring 16 is provided with a circumferential groove 32 and a shoe 33, similar to shoe 20, is located within the groove 32 and both the groove 32 and she shoe 33 are provided with complimentary tapered side walls. Shoe 33 extends through an arc of approximately 180° and the midpoint of the length of the shoe 33 is provided with a longitudinally extending slot 34. A lug 35 carried by a rod 36 is pivotally connected within the slot 34 by a pin 37.

As in the case of the shoe 20, the shoe 33 is provided with tapered ends 38 and as the rod 36 is moved inwardly the ends of the shoe 33 engage the inner end of set screws 39 to wedge the ends of the shoe 33 inwardly against the gear ring 16 to thereby lock the gear ring against rotation. The rod 36 is biased inwardly by a coil spring 40 which surrounds the reduced upper end portion 41 of the rod and bears against the outer end of a cap 42 threaded within an opening in the casing 18.

When the gear ring 12 is in the fixed or nonrotating position and the gear ring 16 is in the rotatable position, the engagement of the teeth 10 on gear 8 with the teeth 11 of gear ring 12 will cause the gear 8 to be moved in the opposite direction from the direction of rotation of the eccentric 3, and at a reduced rate of speed, by a wedging type of action. For example, the gear 8 will move through an arc equal to the length of the difference in number of teeth between the gear 8 and the gear ring 12 during each revolution of the eccentric 3, and in the opposite direction to the direction of rotation of the eccentric. Thus a speed reduction is provided between the input shaft and the gear 8.

By a similar action, if the gear ring 12 is in the freely rotatable position and the gear ring 16 is locked, a second speed reduction will be achieved. In this case, as the eccentric rotates, gear 9 will move in the opposite direction and through an arc equal in length to the difference in number of teeth between the gear 9 and the gear ring 16 during each revolution of the eccentric 3. Due to the fact that gear 9 has a larger diameter than gear 8 this provides a high speed reduction or low output speed.

Figure 3:
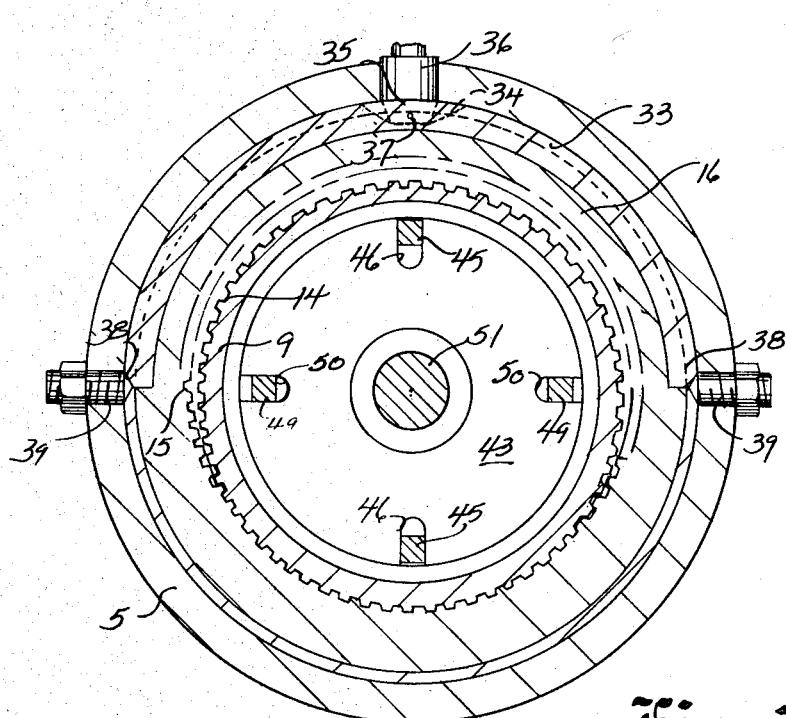
FIG. 3 is a transverse section taken along line 3—3 of FIG. 1.

In either case, whether the speed reduction is provided by the small gear 8 or the large gear 9, the gear unit is rotated in an eccentric path and this eccentric rotation must be converted to concentric or in-line rotation for the output member. To convert the eccentric rotation to a concentric rotation, a plate 43 is mounted flatwise with respect to surface of the gear unit 6 and a pair of pins 44 are press fitted within openings in the gear unit and are provided with square heads 45 which ride within radial slots 46 formed in the periphery of the plate 43. Slots 46 are located diametrically opposite of each other, as best shown in FIG. 3. A second plate 47 is mounted flatwise to the plate 43 and a pair of pins 48 are secured within openings in the plate 47 and are provided with square heads 49 which ride within slots 50 formed in the periphery of the plate 43. Slots 50 are located diametrically opposite of each other and are positioned 90° with respect to the slots 46. The plate 48 is secured to output shaft 51 which is journalled for rotation within the casing 18 by a bearing 52. In addition, the inner end of the output shaft 52 is journalled within the inner end of the eccentric 3 by a bearing 53.

The slotted plate 43 serves to convert the eccentric rotation of gear unit 6 into a concentric rotation in output shaft 51. As the gear unit 6 rotates, the pins 44 attached to gear unit 6 move within the slots 46, and similarly the pins 48 attached to plate 43 move within the slots 50 to thereby rotate the plate 43 and the output shaft 52 about the axis of shaft 1.

As previously mentioned, the rods 23 and 36 which control the position of shoes 20 and 33 are moved by the operating lever 30. As shown in FIG. 1, pins 54 and 55 are mounted in the upper ends 28 and 41 of the rods 23 and 36, respectively, and pins 54 and 55 ride on the upper camming surface of the operating lever, The camming surface includes a low portion or valley 56, a ridge 57, a second valley 58 and a second ridge 59. When the operating lever is in the position shown in FIG. 1, the pins 54 and 55 are on the ridges 57 and 59, respectively. In this position the rods 23 and 36 will be in their outermost position and both of the shoes 20 and 33 will be in the disengaged or released position so that the gear rings 12 and 16 will both be freely rotatable. This will then be a free wheeling position in which the output shaft 51 can be freely rotated. With the motor stopped in this free wheeling position, the vehicle, can be readily towed or pushed, as desired.

By moving the operating lever 30 to the left, as shown in FIG. 1, the pin 55 will move down into the depression 58 while the pin 55 will still be on the ridge 59. The pin 55 being in the depression 58 will permit the spring 40 to move the shoe 33 into the clamping position so that the gear ring 16 will be fixed with respect to the casing 18, while the gear ring 12 will still be in the freely rotatable state. In this condition with the gear ring 16 fixed, a high speed reduction is obtained to thereby provide a low speed for the output shaft 51.

If the rod 30 is shifted to the right, as shown in FIG. 1, the pin 55 will remain on the ridge 57, while the pin 54 will move downwardly into the depression 58. This will reverse the position and enable the gear ring 12 to be clamped to the casing 5, while the gear ring 16 will still be in the freely rotatable position. In this position, with the gear ring 12 fixed, a low speed reduction is obtained so that the output shaft 51 will be driven at a higher rate of speed.

By moving the operating rod 30 farther to the right the pin 55 will drop into the depression 56 while the pin 55 will remain in the depression 58. In this position the springs 27 and 40 will urge both of the shoes 20 and 33 into the clamping positions so that both of the gear rings 12 and 16 will be fixed with respect to the casing. This position constitutes a braking position. This provides a positive lock against free rotation of the output member and thereby prevents movement of the vehicle when the hydraulic motor is not operating. In the conventional drive mechanism a separate brake is normally required to prevent rotation of the output member and provide the necessary braking action during periods of nonoperation of the motor.

The shoes 20 and 33 provide a clutch mechanism for engaging and disengaging the gear rings with respect to the fixed casing. A positive locking mechanism can also be used but the shoes 20 and 33 enable the gear rings to slip under overload conditions and thus are preferred.

The drive mechanism of the invention provides a multiple speed drive and the speed can be readily changed by the operator by merely moving the operating lever 30. In addition, the drive mechanism includes a free wheeling position which permits free rotation of the output shaft and thereby enable the vehicle to be pushed or towed.

The mechanism also includes a built-in braking system which prevents free rotation of the output member and thus eliminates the need for auxiliary braking devices which are normally included with the conventional transmission to lock the drive when the vehicle is parked.

The drive mechanism, when associated with a vehicle, can be used to drive each wheel individually or a single drive mechanism can be employed to drive a plurality of wheels through a conventional differential.

While the above description has been directed to the use of the drive mechanism with a small vehicle such as a tractor, lift truck, snow vehicle or the like, it is contemplated that the drive mechanism can be used in any situation where it is desired to have one or more output speeds along with free wheeling characteristics.

Various modes of carrying out the invention are contemplated as being within the scope of the following claims particularly pointing out and distinctly claiming the subject matter which is regarded as the invention.

I claim:

1. A drive mechanism, comprising a fixed casing, an input member journalled for rotation in said casing, an output member journalled for rotation in said casing, an eccentric operably connected to the input member and disposed to rotate within the casing, a gear unit mounted in the casing and driven by said eccentric, said gear unit including a first gear having a series of teeth and a second gear having a series of teeth, a first gear ring mounted for rotation with respect to the casing and having a series of teeth engaged with the teeth of said first gear, said first gear ring having a greater number of teeth than said first gear, a second gear ring mounted for rotation with respect to the casing and having a series of teeth engaged with the teeth of said second gear, said second gear ring having a greater number of teeth than said second gear, actuating means for selectively engaging and disengaging each gear ring with respect to the casing, rotation of said eccentric when one of said gear rings is engaged and the other of said gear rings is disengaged causing said gear unit to rotate in the opposite direction and at a reduced rate of speed, and converting means operably connecting said gear unit to said output member to convert eccentric rotation of said gear unit to concentric rotation of said output member, disengagement of both of said gear rings permitting free rotation of said output member and engagement of both of said gear rings providing a positive braking action to prevent free rotation of said output member.

2. The drive mechanism of claim 1, wherein said gear unit is provided with a central opening and said eccentric is mounted for rotation within said opening in the gear unit.

3. A drive mechanism, comprising a fixed casing, an input member journalled for rotation in said casing, an output member journalled for rotation in said casing, an eccentric operably connected to the input member and disposed to rotate within the casing, a gear unit mounted in the casing and driven by said eccentric, said gear unit including a first gear having a series of teeth, a gear ring mounted for rotation with respect to the casing and having a series of internal teeth disposed in engagement with the teeth of said gear, said gear having a lesser number of teeth than said gear ring, connecting means for selectively connecting the gear ring with respect to the casing to prevent free rotation of said gear ring, and means operably connecting the gear unit to the output member for converting eccentric rotation of said gear unit to concentric rotation of said output member, rotation of said eccentric when said gear ring is connected to the casing causing said gear unit to rotate in the opposite direction and at a lower rate of speed to thereby provide a speed reduction, said output member being freely rotatable when said gear ring is rotatable with respect to the casing, said connecting means including a shoe engageable with the outer surface of said gear ring, and including means for moving the shoe into engagement with said gear ring and for withdrawing the shoe from engagement with the gear ring.

4. The drive unit of claim 3, wherein the outer surface of said gear ring is provided with a circumferential extending groove and said shoe is located within said groove and extends through an arc of at least approximately 180°.

5. The drive mechanism of claim 4, wherein said shoe and said groove have complimentary tapered side surfaces.

6. The drive mechanism of claim 3, wherein said shoe is generally arcuate in shape and is provided with tapered ends, and said connecting means includes fixed means to be engaged by the tapered ends of the shoe as the shoe is moved into engagement with the gear ring to wedge the ends of the shoe inwardly toward said gear ring.

7. A drive mechanism, comprising a fixed casing, an input member mounted for rotation with respect to the casing, an output member disposed concentrically of said input member and mounted for rotation with respect to said casing, an eccentric secured to the input member, a gear unit having a central opening to receive said eccentric, said gear unit including a first small gear having a series of teeth and a second large gear having a series of teeth, a gear ring mounted for rotation with respect to the casing and having a series of teeth disposed in engagement with the teeth of said first gear, said gear ring having a greater number of teeth than said first gear, a second gear ring mounted for rotation with respect to the casing and having a series of teeth engaged with the teeth of said second gear, said second gear ring having a greater number of teeth than said second gear, actuating means for selectively engaging and disengaging each gear ring with respect to the casing, rotation of said eccentric when one of said gear rings is engaged and the other of said gear rings is disengaged causing said gear unit to rotate in the opposite direction and at a reduced rate of speed, and converting means operably connecting said gear unit to said output member to convert eccentric rotation of said gear unit to concentric rotation of said output member, disengagement of both of said gear rings permitting free rotation of said output member to thereby provide a free wheeling condition and engagement of both of said gear rings providing a positive braking action to prevent free rotation of said output member.

8. The drive mechanism of claim 7, wherein said actuating means includes a shoe engageable with each gear ring, and operating means located on the exterior of the casing and operably connected to said shoes for moving said shoes into an out of engagement with the respective gear rings.

9. The drive mechanism of claim 7, wherein said operating means includes a rod connected to each shoe and extending outwardly of the casing, and an operating member connected to both of said rods, said operating member being arranged so that movement of said operating member will selectively move the rods axially to thereby move the shoes into and out of engagement with the gear rings.

References Cited

UNITED STATES PATENTS

| | | | |
|---|---|---|---|
| 1,590,166 | 6/1926 | Howard | 74—804 |
| 2,846,034 | 8/1958 | Mros | 74—804X |
| 2,959,983 | 11/1960 | Wise | 74—804X |
| 3,028,513 | 4/1962 | Sundt | 74—804X |

ARTHUR T. McKEON, Primary Examiner